United States Patent [19]
Tanno et al.

[11] 3,984,844
[45] Oct. 5, 1976

[54] THERMAL RECORDING APPARATUS

[75] Inventors: Kiyohiko Tanno; Yasuyuki Kojima, both of Hitachi, Japan

[73] Assignee: Hitachi, Ltd., Japan

[22] Filed: Nov. 18, 1975

[21] Appl. No.: 633,115

[30] Foreign Application Priority Data
Nov. 20, 1974 Japan.............................. 49-132735
Jan. 12, 1975 Japan.................................. 50-5789

[52] U.S. Cl.......................... 346/76 R; 346/139 C; 219/216
[51] Int. Cl.²......................................... G01D 15/10
[58] Field of Search....... 219/216; 346/76 R, 139 C, 346/74 R

[56] References Cited
UNITED STATES PATENTS

| | | | |
|---|---|---|---|
| 3,163,489 | 12/1964 | Borne et al. .......................... 346/76 |
| 3,312,979 | 4/1967 | Torre et al. ...................... 346/76 R |
| 3,624,661 | 11/1971 | Shebanow..................... 346/139 CM |
| 3,718,936 | 2/1973 | Rice, Jr. ....................... 346/139 C X |
| 3,825,722 | 7/1974 | Taniguchi ........................... 219/216 |
| 3,833,789 | 9/1974 | Taniguchi ........................... 219/216 |

*Primary Examiner*—George H. Miller, Jr.
*Attorney, Agent, or Firm*—Craig & Antonelli

[57] ABSTRACT

A plurality of electrodes are arranged alternately on both sides of a predetermined strip-like region of an insulated substrate, thus making up a thermal head with a plurality of heating resistor elements bridging the electrodes. A potential is selectively applied to the electrodes on one side of the strip-like region and those electrodes adjacent thereto on the other side of the region thereby to energize the heating resistor elements interposed between the particular electrodes. Heat thus generated is used to visually record information in accordance with electrical signals on the thermally responsive recording paper capable of being colored in response to heat.

4 Claims, 16 Drawing Figures

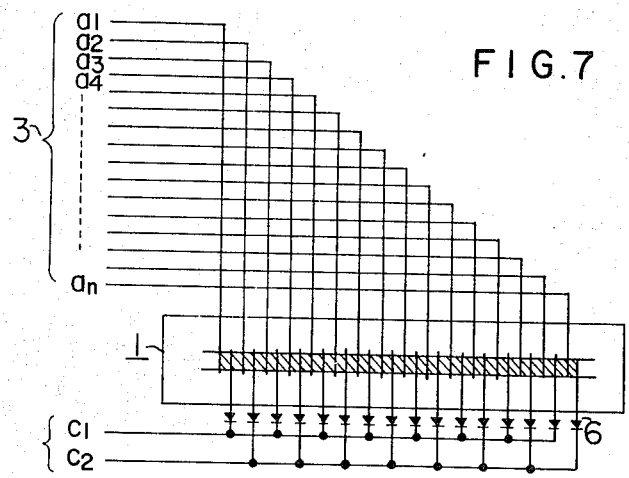
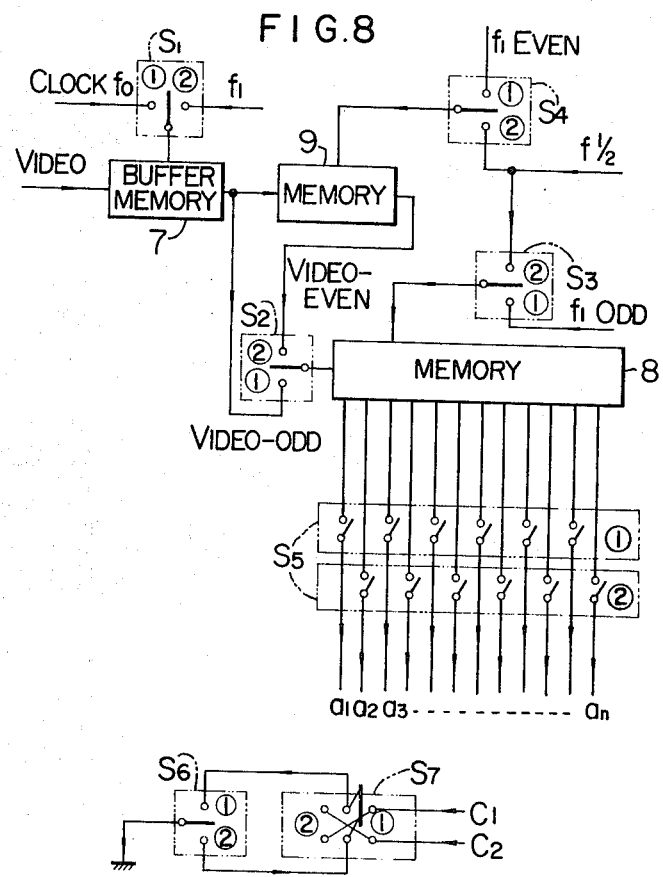

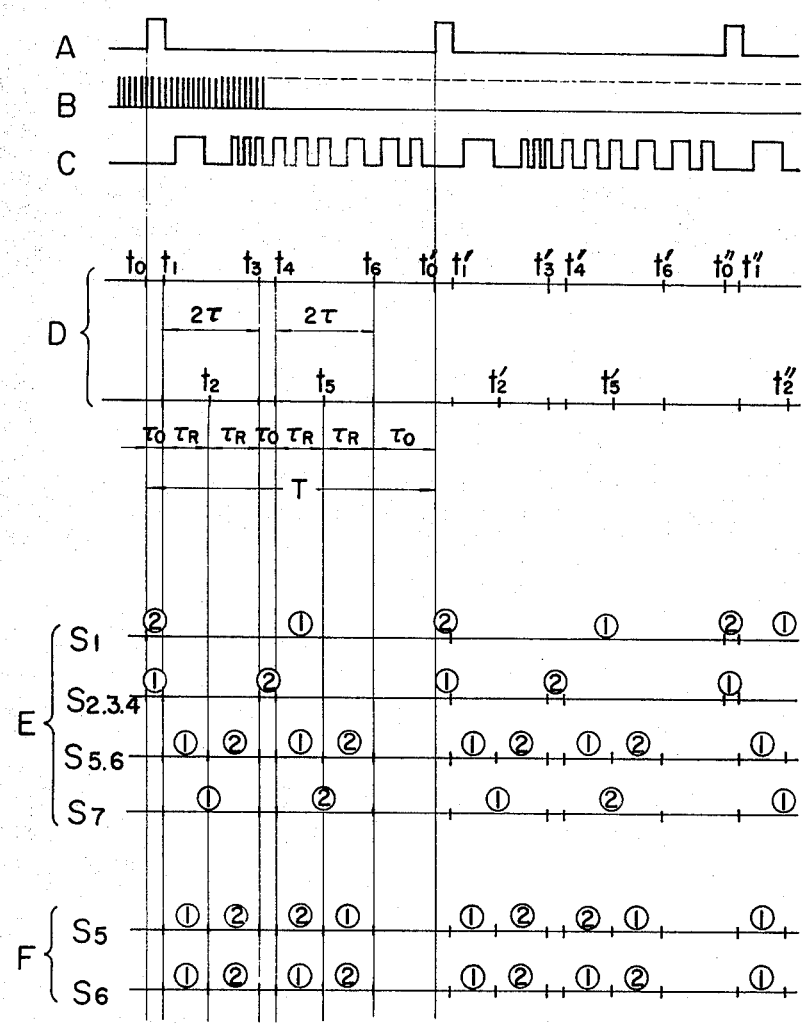

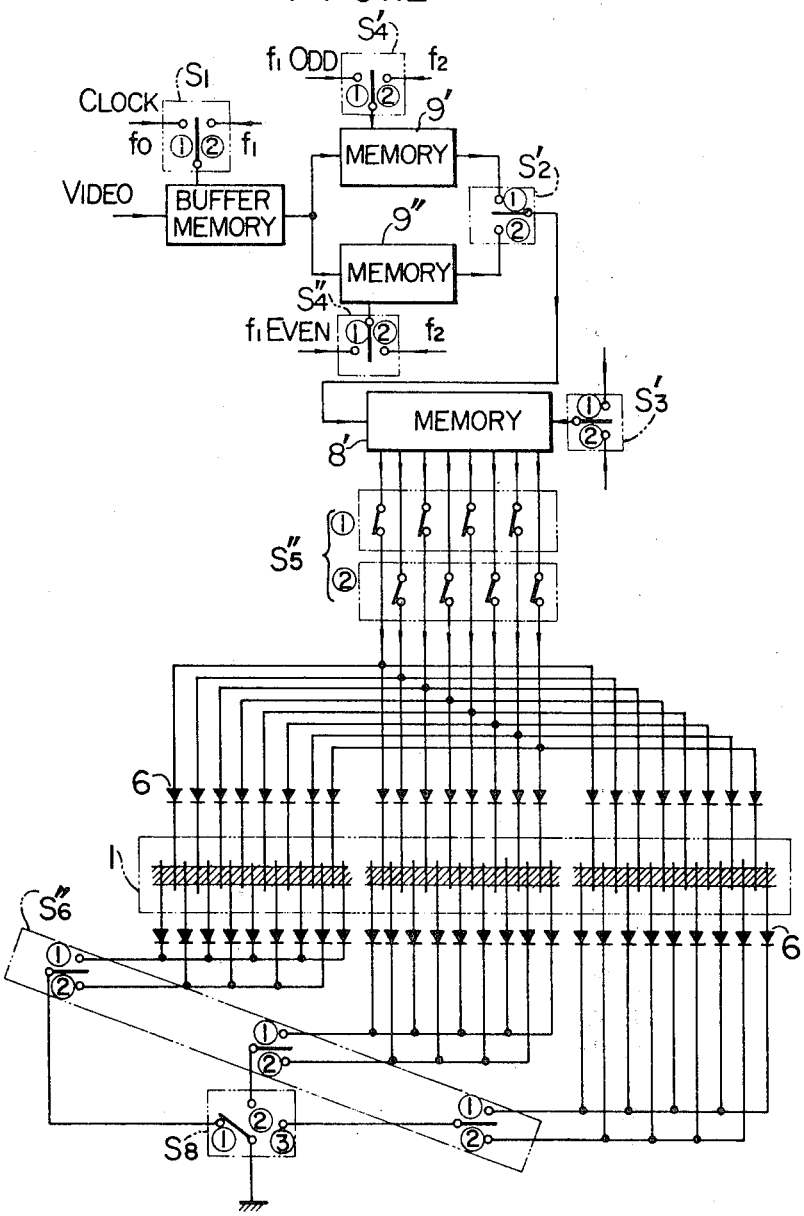

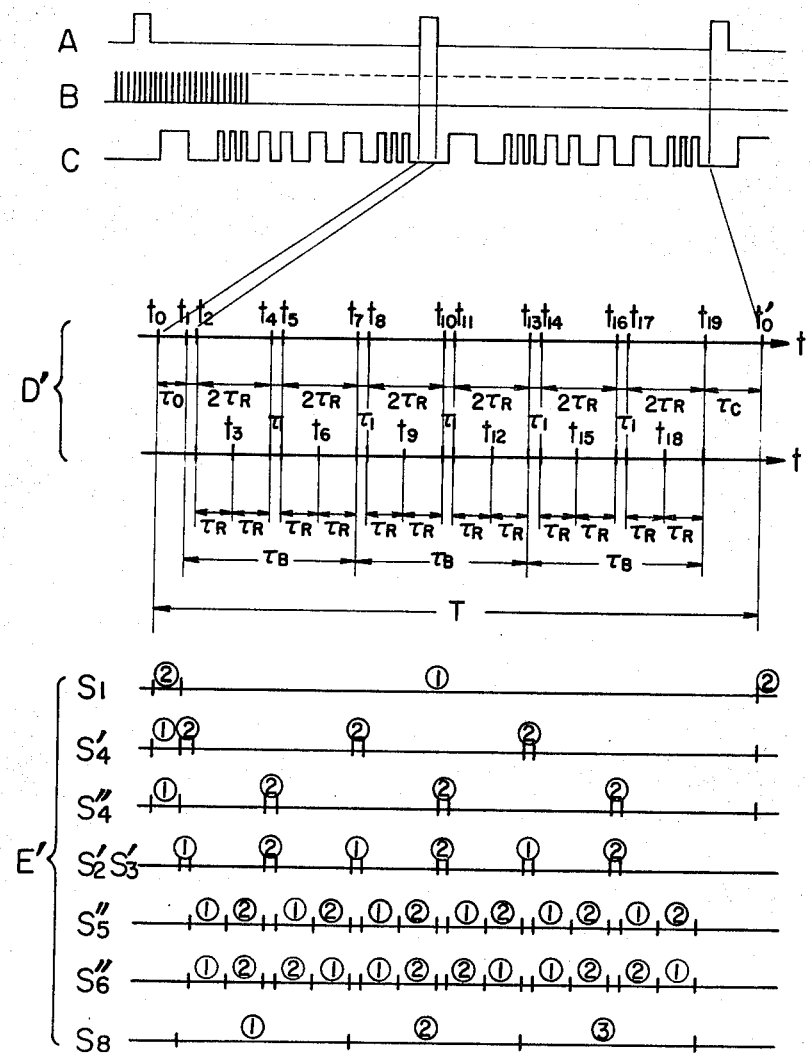

THERMAL RECORDING APPARATUS

BACKGROUND OF THE INVENTION

1. Field of the Invention

This invention relates to a thermal responsive recording apparatus, or more in particular to an improvement in a thermal head high inn resolution and a driving circuit therefor.

2. Description of the Prior Art

The art of thermal recording finds wide application in facsimile and printers and its use is extended even wider. With this trend, a high resolution of information recording is required and owes very much to the heating resistor section incorporated in the thermal head. In the conventional art, this heating resistor section is made by thin film technique, thick film technique or by semiconductor techniques, and it has been difficult to produce a thermal head with a high resolution.

SUMMARY OF THE INVENTION

An object of the present invention is to provide a recording apparatus using a thermal head high in resolution.

Another object of the invention is to provide a recording apparatus having a thermal head high in resolution which can be easily fabricated.

Another object of the invention is to provide a thermal recording apparatus having a simplified driving circuit.

Another object of the invention is to provide a thermal recording apparatus comprising a thermal head having heating resistor elements in each of which current distribution is uniform.

This invention is characterized by a thermal head comprising an insulated substrate, a plurality of lead electrodes arranged alternately on both sides of a predetermined strip-like region of the substrate and a plurality of heating resistor elements bridging the electrodes, and by a driving circuit for controlling voltages selectively applied to a plurality of groups into which the electrodes on each side of the region are divided.

BRIEF DESCRIPTION OF THE DRAWINGS

FIG. 7 is a wiring diagram of the lead electrodes of the thermal head shown in FIG. 1.

FIG. 8 is a block diagram showing a specific driving circuit for the thermal head.

FIG. 9 is a time chart for the operation of the driving circuit shown in FIG. 8.

FIGS. 11 and 12 are block diagrams of modifications of the driving circuit.

FIG. 13 is a time chart for the driving circuit shown in FIG. 12.

DESCRIPTION OF THE PREFERRED EMBODIMENTS

Figure 1:
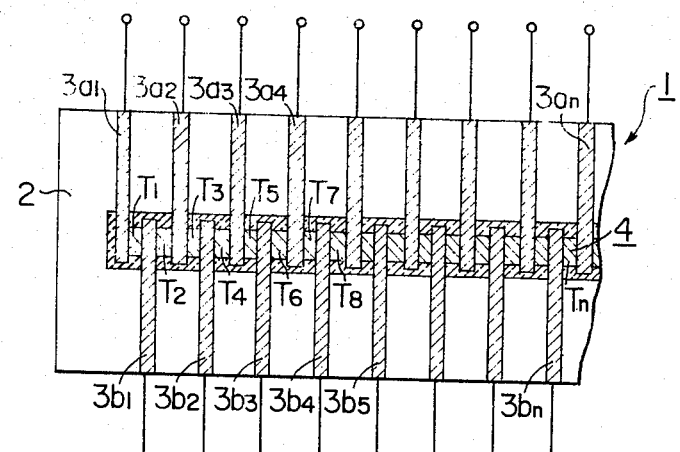
FIG. 1 is a cross sectional view in plan showing part of an embodiment of the thermal head according to the invention.
Figure 2:
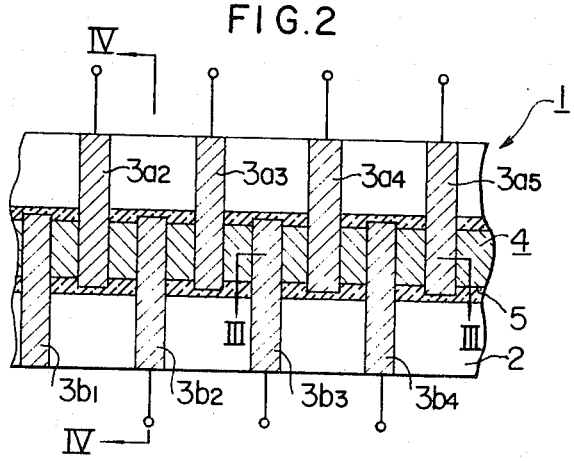
FIG. 2 is a partially enlarged cross sectional view in plan of the thermal head shown in FIG. 1.
Figure 3:
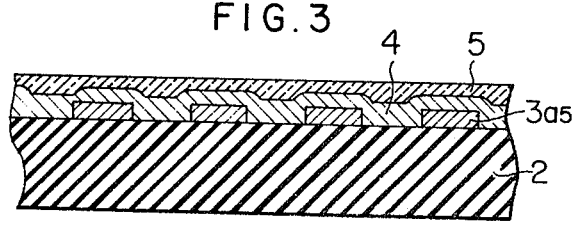
FIG. 3 is a sectional view taken in line III — III in FIG. 2.
Figure 4:
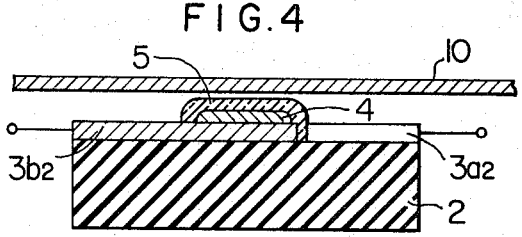
FIG. 4 is a sectional view taken in line IV — IV in FIG. 2.

Referring to FIG. 1, reference numeral 1 shows a thermal head, numeral 2 an insulated substrate made of a ceramic plate or the like which has a predetermined strip-like region, numerals $3a1, 3a2, \ldots 3an$ a plurality of lead electrodes printed on one side of the strip-like region, numerals $3b1, 3b2 \ldots 3bn$ another plurality of lead electrodes printed on the other side thereof, and numeral 4 resistive material layer formed on and between the lead electrodes in the strip-like region. The heating strip layer 4 is thus divided electrically into a plurality of heating resistor elements $T1, T2 \ldots Tn$ respectively interposed between the electrodes $3a1$ and $3b1$, between $3b1$ and $3a2$, and so on. More detailed explanation will be made with reference to FIGS. 2 to 4. The lead electrodes $3a1, 3a2 \ldots 3an$ and $3b1, 3b2 \ldots 3bn$ are made of a pasty thick film material such as silver-palladium or gold-palladium and printed or soldered on the predetermined strip-like region of the substrate 2 to which the heating strip 4 is to be attached. The lead electrodes printed on the predetermined region should preferably be arranged in such a manner that their foremost ends extend through the predetermined region crosswise to reach the other side thereof or protrude from the same. The heating strip 4 may completely cover the predetermined region. The strip which may also be made of silver-ruthenium paste is sintered and fixed. In order to improve the resistance to abrasion, the upper surface of the strip 4 may be protected by a protective layer 5 of glass or the like. Heat generated in the resistor elements $T1, T2 \ldots Tn$ is transmitted to the thermally responsive recording paper 10 in contact with the flat upper surfaces of the protective layer 5. One of the advantages of such a thermal head is that, except for the lead electrodes on the ends of the region, each electrode may be used commonly for adjacent resistor elements $T1, T2 \ldots Tn$ on both sides thereof, thus making it possible to reduce considerably the number of the lead electrodes to be connected to the resistor elements on each side. Another advantage is that current flowing in each of the resistor elements $T1, T2 \ldots Tn$ defined between the lead electrodes $3a1, 3a2 \ldots 3an$ and $3b1, 3b2 \ldots 3bn$ is almost uniform and far less locally concentrated, resulting in proper formation of picture elements on the recording paper while at the same time preventing local deterioration of the electrodes and resistor elements. The more so when the lead electrodes defining the resistors extend transversely across the opposite side edges.

Figure 5:
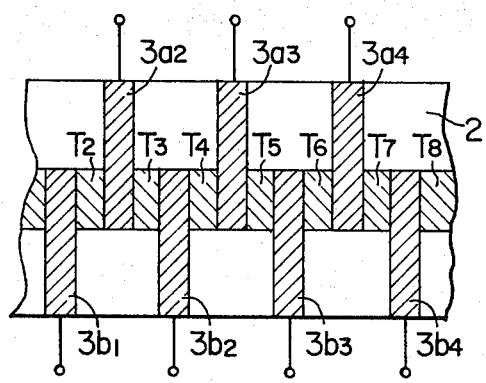
FIGS. 5 and 6 are cross sectional views in plan showing second and third embodiments of the thermal head.
Figure 6:
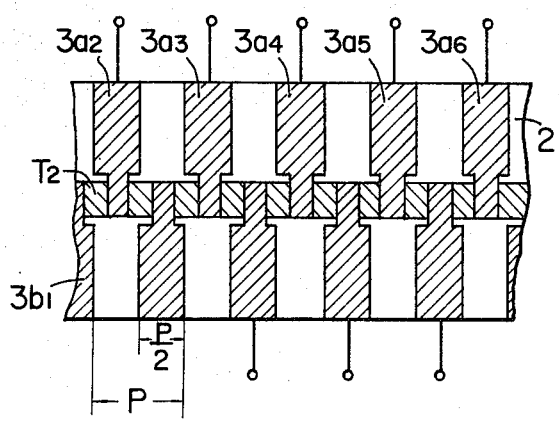

A modification of the thermal head is shown in FIG. 5 and is different from the thermal head described above in that the ends of the lead electrodes $3a1, 3a2 \ldots 3an$ and $3b1, 3b2 \ldots 3bn$ do not extend to such a degree as to protrude from the other side of the resistive strip region. In another modification of the thermal head shown in FIG. 6, the leading portions of the lead electrodes $3a1, 3a2, \ldots 3an$ and $3b1, 3b2 \ldots 3bn$ are wider than the portions thereof contacting the strip 4. In order to lessen the picture elements in size and improve the resolution, it is necessary to reduce the size of each resistor element defined by the electrodes on the one hand and to render the lead electrodes thinner on the other. The thinning of the lead electrodes, however, makes the connection with the wiring resistance or current capacity external terminals difficult. These two problems are solved at the same time by providing the wider leading portions of the electrodes as in the abovementioned modification. In the embodiment shown in the drawing, the effective width of the leading portions is substantially one half of the pitch P at which the lead electrodes 3a1, 3a2 . . . 3an or 3b1, 3b2 . . . 3bn are arranged on one side.

Next, explanation will be made of the driving circuit which applies an electric potential to the lead electrodes 3a1, 3a2 . . . 3an and 3b1, 3b2 . . . 3bn in order to render current flow selectively in the resistor elements T1, T2 . . . Tn of the thermal head.

In the diagram of FIG. 7, the lead electrodes 3b1, 3b2 . . . 3bn are divided into an odd-numbered group including 3b1, 3b3, 3b5 . . . and an even-numbered group including 3b2, 3b4, 3b6 . . . , so that the lead electrodes in each group are connected commonly to lead wires C1 and C2 respectively through reverse current-blocking diodes 6. In this way, the driving circuit applies a potential between the lead electrodes 3a1, 3a2 . . . 3an and lead wires C1, C2 in such a combination as to heat desired ones of the resistor elements T1 to Tn.

The driving circuit operating in the above-mentioned manner is shown in FIG. 8. Reference numeral 7 shows a buffer memory for storing recording signals corresponding to one scanning line time-quantized. Symbol S1 shows a change-over switch for the driving clock signals for the buffer memory 7. Numeral 8 shows a memory or typically a shift register of series-input parallel-output type for storing half the recording signals corresponding to one scanning line and for producing them simultaneously in parallel. Symbol S2 shows a switch for selecting an input signal to the memory 8, symbol S3 a change-over switch for the drive clock signals for memory 8, numeral 9 a memory for storing the other half of the recording signals corresponding to one scanning line, symbol S4 a change-over switch for the drive clock signals for the memory 9, symbol S5 a gated switch for producing the output of the memory 8 in two signal groups of odd and even numbers, symbol S6 a switch for selecting either lead wire C1 or C2, and S7 a cross-switch operated in response to the switch S2.

The operation of this driving circuit will be explained with reference to the time sequence shown in FIG. 9. In the drawing under consideration, A to C show input signals, being a synchronizing signal, a clock pulse signal and a recording information signal, respectively. Desirably, the clock signal B is transmitted from the transmitting end but may alternatively be produced at the receiving end. The timing of circuit operation is shown in D, while the operation of switches is illustrated in E and F. The description below will be made mainly with reference to the operation timing diagram D.

The recording information signal C is stored in the buffer memory 7 driven by the signal B when the switch S1 is connected to (1). In the case where the recording signals corresponding to a scanning line are applied in the form of parallel signals, they are converted into series signals by the use of anotehr buffer memory. Upon completion of the receipt of the recording information signals corresponding to a scanning line at time $t_0$, the switch S1 is connected to (2), and the switches S2, S3 and S4 to (1). In response to another clock signal f1, the recording information signals corresponding to a scanning line are divided in time sequence, so that odd-numbered signals and even-numbered signals are stored in the memories 8 and 9 within time $\tau_0$ respectively. Generally, the time $\tau_0$ is made to coincide with the initiation of the synchronizing signal in timing but may be displaced to some degree so far as the clock signal f1 is selected in such a manner that time $\tau_0$ elapses within the width of the synchronizing signal.

Figure 10A:
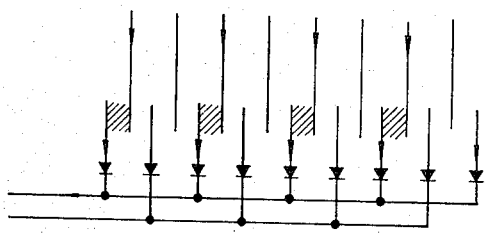
FIGS. 10a to 10d are diagrams for explaining the recording positions.

When the information has been stored in the memories 8 and 9 at time $t_1$, then the clock signal f1 is also terminated. Under this condition, the memory 8 is producing parallel outputs. The switch S1 is connected to (1), thereby causing the recording current to flow in the lead electrodes a1, a3, a5 . . . of the thermal head. At the same time, the switches S6 and S7 are connected to (1), with the result that current flows in the recording apparatus shown in FIG. 10a (shadowed portion) thereby to effect a recording operation for the time period $\tau_R$ up to time point $t_2$.

Figure 10B:
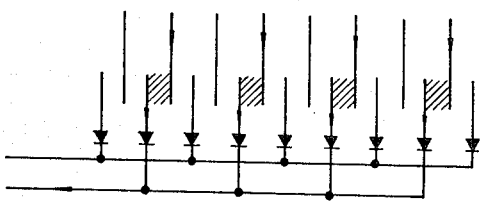
Figure 10C:
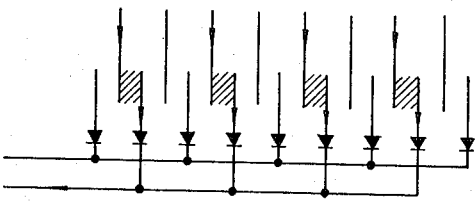
Figure 10D:
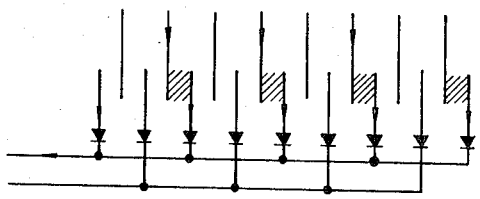

After completing the recording operation at the first recording position as mentioned above, the switches S6 and S7 are connected to (2) at time point $t_2$. Current flows at the recording position shown in FIG. 10b for the period $\tau_R$ up to time point $t_3$. Upon completion of recording on the basis of odd-numbered information signals, the switches S2, S3 and S4 are connected to (2), so that even-numbered signals are read from the memory 9 by the memory 8 during the period $\tau_0$. When the reading process ends at time point $t_4$, the switches S5 and S6 are returned to (1), whereas the switch S7 is connected to (2). In this way, current flows at the third recording position for recording during the period $\tau_R$ up to time point $t_5$, as shown in FIG. 10c. After the recording at the third recording position is completed, the switches S5 and S6 are connected to (2) thereby to transfer to the fourth recording position shown in FIG. 10d. Thus, the recording operation for even-numbered signals is completed. By the way, $\tau_C$ shows the cooling time of the recording head, even though, strictly speaking, the effective cooling time if $\tau_0 + \tau_C$.

During these recording periods $4\tau_R + \tau_C + \tau_0$, the switch S1 remains connected to (1) thereby to store recording information signals associated with a new scanning line. If the recording information is received intermittently within a short period of time, say, $\tau_0$, then it is possible to store the information directly in the memories 8 and 9 without the buffer memory 7.

In the above-mentioned embodiment, the recording operation may begin with even-numbered signals instead of odd-numbered ones. Also, the first, second, third and fourth recording positions may be changed in any desired order. Further, the switches S5 and S6 may be synchronized to repeat the transfer between (1) and (2) a plurality of times during $2\tau_R$.

The auxiliary scanning is conducted by feeding the recording paper in the direction at right angles to the direction of arrangement of the thermal head. Symbol T shows the intervals between synchronizing signals in a scanning line.

The switch S7 may be dispensed with if the switches S5 and S6 are operated in the manner as shown in F of FIG. 9. Also, during the periods of time for which the switch-connection is not designated in the timing chart E (for example, between $t_1$ and $t_3$ and between $t_4$ and $t_0$ for switches S2, S3 and S4; and between $t_0$ and $t_1$ aand between $t_3$ and $t_4$ for switches S5 and S6), arrangement should be made in such a manner as to either lack any input signal (as in the former case) or to sufficiently reduce the time of input signal application thereby to dissociate it from the operation (as in the latter case). Ideally, however, the contacts should be left open.

In the manner as mentioned above, the recording information signal is stored in a new thermal recording head.

By the way, the quality of record prints can be improved by eliminating blotted and undesirable recording. In the above-mentioned embodiments, care must be taken especially not to allow any leak-in. In this connection, even though no recording is effected by injection of 1/9 of the operating power into the heating elements other than the shadowed ones in FIGS. 10a to 10d, the arrangement as shown in FIG. 11 is recommended to further reduce the possibility of erroneous recording.

Figure 11:
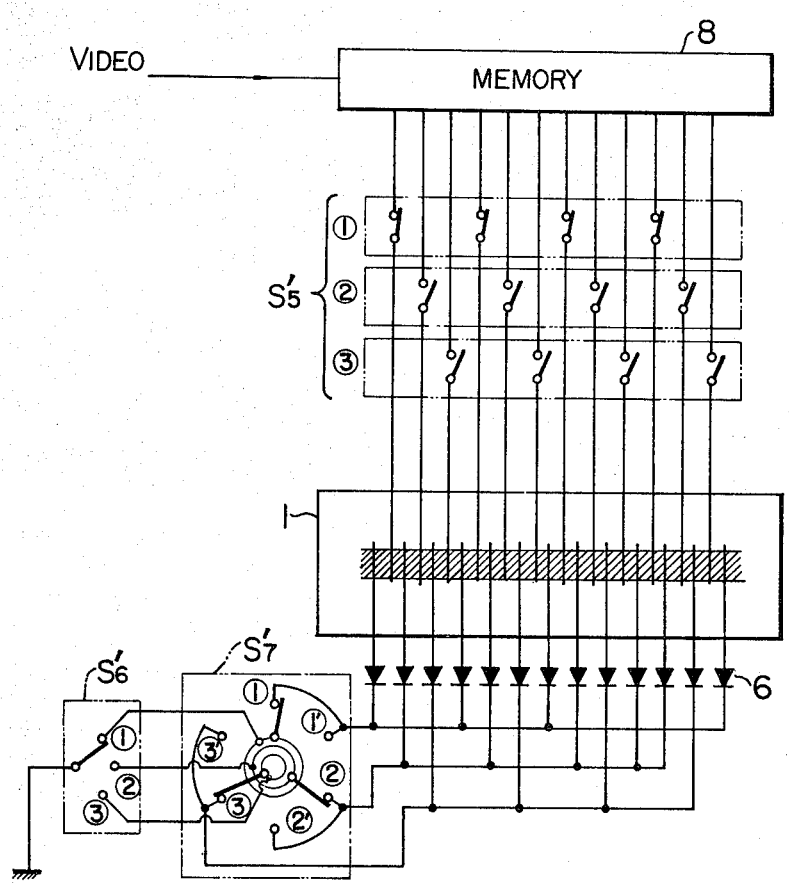

In FIG. 11, reference numerals 1, 6 and 8 show another thermal head, a memory and a reverse current-blocking element respectively similar to those included in the embodiment described above. Symbols S5' to S7' show switches corresponding to the switches S5 to S7. The switch S5' is a gated switch comprising three switch units for dividing the output of the memory 8 into three types of signals in the order of synchronism. The switch S6' has a function to select sequentially three contacts into which the other terminal of the recording head 1 are divided in cycles. The cross switch S7' selects the recording sequence in accordance with the odd- or even-numbered state of the recording information signals. By so doing, five heating elements may be interposed between the recording positions involving the simultaneous recording, whereby power injection into them is reduced to 1/25, thus further reducing the chance of leak-in. The same idea applies also to a case in which the output of memory 8 is divided into more than three, even further reducing the possibility of leak-in.

In the event that a printer is used which involves a great number of recording information signals in a scanning line, the recording positions are generally already determined, and it is possible to reduce the capacity of the memory 8 and the number of driving switch units S5 by separately energizing the heating elements. An embodiment involving such a principle is shown in FIG. 12. In this drawing, there are provided a couple of ½ line memories 9' and 9'', and the capacity of the memory 8' of parallel output type is ½n the number of the heating elements of the recording head 1. Leads on one side of the recording head 1 are divided into n blocks through a plurality of reverse current-blocking elements 6 represented by semiconductor diodes. The same odd- or even-numbered group of the leads in each block are connected to the gated switch S5'' through a common terminal. In similar fashion, the leads on the other side are divided into n blocks through reverse current-blocking elements 10, and after being separated into odd- and even-numbered groups in each block, are connected to the switch S6''. Unlike the case in FIG. 8, however, the switch S6'' is further connected to the block-selecting switch S8.

The driving circuit of FIG. 12 is operated in the timing shown in FIG. 13. Symbols A to C and D' and E' in FIG. 13 correspond to symbols A to E in FIG. 9 respectively. The explanation below will be made mainly with reference to timing D'. In FIG. 12, n blocks ($n\tau_B$) are recorded in each interval T of synchronizing signals. This operation is characterized in that odd- and even-numbered recording information signals stored in the ½ line memories 9' and 9'' are alternately read by the memory 8' in a predetermined number so that the whole recording head is driven by repeating n times the 4-stage recording operation shown in FIGS. 10a to 10d and also in that the recording block in transferred by the block-transfer switch S8.

In other words, the recording information signals corresponding to a scanning line which are received and stored in the buffer memory 7 are divided into odd- and even-numbered signals and stored in ½ line memories 9' and 9'' respectively during the period of time ($\tau_0$) from $t_0$ to $t_1$; a predetermined number of signals are read by the memory 8' of parallel output type from one of the ½ line memories during the period of time ($\tau_1$) from $t_1$ to $t_2$; and the recording information signals in one half of a block are recorded during the period of time ($2\tau_R$) from $t_2$ to $t_4$. During the time period from $t_4$ to $t_5$, the recording information signals in one half of a block are read from the other ½ line memory for the period of time $\tau_1$, and recorded for the time period $2\tau_R$, thus completing the recording for a block ($\tau_B$). This operation corresponds to that shown in FIG. 9. Following this operation, information in the next block is read. Similarly, transfer is made to subsequent blocks. This cycle of operation is repeated until all the recording positions of the recording head are covered, thus completing the recording of a line of printer information. This idea may be applied also to the case of FIG. 11, whereby a multiplicity of recording positions can be controlled by means of a small number of driving circuits.

The timing of switch operation and other points of consideration for the operation in FIG. 8 also apply to the operation of the embodiment of FIG. 12.

In case a continuous signal such as a facsimile signal where there is not separation between blocks, one group of the diodes shown in FIG. 12 may be dispensed with and resistors may be electrically continuous.

Further, in the embodiments described above, the switches may be electronic ones including transistors and others.

We claim:

1. A thermal recording apparatus comprising an insulated substrate, a heating strip of a resistive material on said substrate, two groups of lead electrodes extending through and transversally of said heating strip, the electrodes of one of said groups being interleaved by the electrodes of the other group to electrically separate said heating strip into resistor elements, each lead electrode of one of said groups crossing one side edge of said heating strip and being in contact with the other side edge of said heating strip while each lead electrode of the other group crossing said other side edge of said heating strip and being in contact with said one side edge of said heating strip, and a driving circuit for selectively energizing said resistor elements through said lead electrodes.

2. A thermal recording apparatus according to claim 1, in which said heating strip overlies said lead electrodes.

3. A thermal recording apparatus according to claim 1, in which that part of each said electrode which is not in contact with said heating strip is wider than the other part of said electrode in contact with said heating strip.

4. A thermal recording apparatus according to claim 1, in which each said lead electrode extends to such an extent as to cross both of said side edges of said heating strip.

* * * * *